(12) United States Patent
Kim et al.

(10) Patent No.: US 7,715,890 B2
(45) Date of Patent: May 11, 2010

(54) MAGNETIC LEVITATION SLIDING STRUCTURE

(75) Inventors: Jong-soon Kim, Gimhae-si (KR); Hyun-jun Cho, Changwon-si (KR); Young-han Chin, Changwon-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 179 days.

(21) Appl. No.: 11/888,541

(22) Filed: Aug. 1, 2007

(65) Prior Publication Data

US 2008/0061914 A1 Mar. 13, 2008

(30) Foreign Application Priority Data

Sep. 8, 2006 (KR) .................. 10-2006-0087057

(51) Int. Cl.
*H04M 1/00* (2006.01)
*H01F 7/02* (2006.01)

(52) U.S. Cl. .................... 455/575.4; 335/306
(58) Field of Classification Search ......... 335/205–207, 335/306; 455/575.1, 575.4; 361/756, 755
See application file for complete search history.

(56) References Cited

U.S. PATENT DOCUMENTS

| | | | | |
|---|---|---|---|---|
| 5,213,307 A | * | 5/1993 | Perrillat-Amede | 251/65 |
| 6,950,316 B2 | * | 9/2005 | Pan et al. | 361/814 |
| 7,269,451 B2 | * | 9/2007 | Kwon | 455/575.4 |
| 7,363,065 B2 | * | 4/2008 | Lee | 455/575.3 |
| 2003/0006871 A1 | * | 1/2003 | Post | 335/306 |
| 2005/0000059 A1 | * | 1/2005 | Sung et al. | 16/320 |
| 2005/0059443 A1 | * | 3/2005 | Pan et al. | 455/575.4 |
| 2005/0079902 A1 | * | 4/2005 | Chen et al. | 455/575.4 |
| 2005/0272487 A1 | * | 12/2005 | Lee | 455/575.4 |

FOREIGN PATENT DOCUMENTS

KR 1020050037649 A 4/2005
KR 1020050089584 A 9/2005

OTHER PUBLICATIONS

Cho et al., U.S. Appl. No. 11/891,791, filed Aug. 13, 2007.
Cho et al., U.S. Appl. No. 11/891,985, filed Aug. 14, 2007.
Cho, U.S. Appl. No. 12/009,522, filed Jan. 18, 2008.
Cho et al., U.S. Appl. No. 12/011,407, filed Jan. 25, 2008.

* cited by examiner

*Primary Examiner*—Elvin G Enad
*Assistant Examiner*—Alexander Talpalatskiy
(74) *Attorney, Agent, or Firm*—Drinker Biddle & Reath LLP

(57) ABSTRACT

A magnetic levitation sliding structure is provided for a portable electronic device. The sliding structure includes a first slider member with a guide portion, a second slider member with a receiving portion that mates with the guide portion, a first magnet coupled with the guide portion and having magnetic poles arranged in a direction perpendicular to a sliding direction, and a spaced-apart pair of second magnets coupled with the receiving portion. The first magnet is configured between the spaced-apart pair of second magnets for facilitating relative sliding movement of the first and second slider members. A portable electronic device including the magnetic levitation sliding structure is also provided.

20 Claims, 11 Drawing Sheets

MAGNETIC LEVITATION SLIDING STRUCTURE

CROSS-REFERENCE TO RELATED PATENT APPLICATION

This application claims the benefit of Korean Patent Application No. 10-2006-0087057, filed on Sep. 8, 2006, in the Korean Intellectual Property Office, the disclosure of which is incorporated herein in its entirety by reference.

BACKGROUND OF THE INVENTION

1. Field of the Invention

The present invention relates generally to a sliding structure, and more particularly, to a magnetic levitation sliding structure.

2. Description of the Related Art

Recently, sliding structures have been used in mobile electronic devices, such as, for example mobile phones, cameras, or portable multimedia players (PMPs), because of their convenience in use and refined design.

FIG. 1A is a perspective view of a conventional sliding type mobile phone 10. FIG. 1B is a partial see-through side view of the conventional sliding type mobile phone 10 of FIG. 1A.

Referring to FIGS. 1A and 1B, the conventional sliding type mobile phone 10 includes a receiver unit 20 (second movable portion) including a display unit 2 formed thereon, and a transmitter unit 30 (first movable portion) including a keypad unit 3, such as dialing keys, configured thereon. The conventional sliding type mobile phone 10 includes a conventional sliding structure 40 such that the conventional mobile phone 10 may be used to receive and transmit calls or messages after sliding the receiver unit 20 upwardly relative to the transmitter unit 30 (or vice versa).

Referring to FIG. 1B, the conventional sliding structure 40, which is disclosed in Korean Patent Publication No. 10-2005-0037649, includes a first slider member 41 and a second slider member 42 that slides on or relative to the first slider member 41.

The first slider member 41 includes a first magnetic force generator 43 and the second slider member 42 includes a pair of second magnetic force generators 44a and 44b, so as to aid a sliding operation using a magnetic force.

In the conventional sliding structure 40, a friction between the first slider member 41 and the second slider member 42 makes the sliding mechanism stiff to operate. In particular, when the units 20 and 30 are oriented such that an attraction force acts between the first magnetic force generator 43 and the second magnetic force generators 44a and 44b during the sliding operation, the friction increases, thereby requiring a greater force to handle the conventional sliding structure 40 and making the sliding operation harder.

FIG. 1C is a view illustrating another conventional sliding structure 50. Referring to FIG. 1C, the sliding structure 50, disclosed in Korean Patent Publication No. 10-2005-0089584, includes a first slider member 51 and a second slider member 52 that slides on or relative to the first slider member 51.

The first slider member 51 includes a first magnet 53 having a generally horseshoe shaped, C-shaped or sideways U-shaped cross-section, and the second slider member 52 includes a second magnet 54 that has a shape similar to that of the first magnet 53. The first magnet 53 and the second magnet 54 are alternately arranged (i.e., an arm of one magnet is configured in a channel of the other magnet and vice versa) to facilitate a sliding operation.

In the sliding structure 50, repelling forces operate between the N pole of the first magnet 53 and the N pole of the second magnet 54, and between the S pole of the first magnet 53 and the S pole of the second magnet 54 so that a sliding operation can be performed. Simultaneously, an attraction force also operates between the S pole of the first magnet 53 and the N pole of the second magnet 54. Accordingly, a sliding operation does not proceed smoothly since a greater force is required to push the sliding structure 50 to overcome the attraction between the first magnet 53 and the second magnet 54.

In addition, in the sliding structure 50, since the first magnet 53 and the second magnet 54, which have horseshoe shapes, are alternately arranged, a large space for such arrangement is required, and thus the thickness of the sliding structure 50 is increased. Also, in curved parts on which parts of the first magnetic member 53 and the second magnetic member 54 are not overlapped, since a repelling force between the parts of the first magnetic member 53 and the second magnetic member 54 is reduced, the sliding operation can not be easily performed.

SUMMARY OF THE INVENTION

According to an aspect of the present invention, there is provided a magnetic levitation sliding structure comprising: a first slider member including a guide portion and a first magnet unit coupled with the guide portion, the first magnet unit extending at least a portion of the guide portion; and a second slider member including a receiving portion and a pair of spaced-apart second magnet units coupled with the receiving portion, the receiving portion being configured to receive the guide portion and the first magnet unit between the pair of spaced-apart second magnet units, wherein the first magnet unit and pair of spaced-apart second magnet unit are configured to facilitate relative sliding movement of the first and second members.

The sliding structure may further comprise auxiliary receiving portions extending from both sides of the first slider member and each receiving a part of the receiving portion. The auxiliary receiving portion may have a generally L-shaped cross-sectional shape.

The receiving portion may have a generally J-shaped cross-sectional shape.

The first magnet unit may be longer than the second magnet units, and the first magnet unit may comprise: a first end magnet; a second end magnet spaced apart from the first end magnet; and an intermediate magnet disposed between the first and second end magnets such that the first and second end magnets are collinear and coextensive with the intermediate magnet. That is, a first end of the intermediate magnet may contact the first end magnet, and a second end of the intermediate magnet may contact the second end magnet.

The first and second end magnets may be configured so that the magnetic poles thereof are oriented similarly to each other and oppositely of the magnetic poles of the intermediate magnet.

Each of the second magnet units of the spaced-apart pair may be configured so that their magnetic poles are oriented similarly to each other but opposite to the order of the magnetic poles of the intermediate magnet unit.

The intermediate magnet and the second magnet units may be disposed so that an imaginary line, which is perpendicular to the lengths of the second magnet units and connects facing surfaces of the second magnet units, can pass through at least a part of the intermediate magnet during a sliding operation.

The sliding structure may further comprise magnetic shields disposed on at least a part of the first magnet unit.

The sliding structure may further comprise magnetic shields disposed on at least a part of the second magnet units.

The magnetic shields may be formed of a ferromagnetic substance.

DETAILED DESCRIPTION OF THE EMBODIMENTS

The present invention will now be described more fully with reference to the accompanying drawings, in which exemplary embodiments of the invention are shown.

Figure 2:
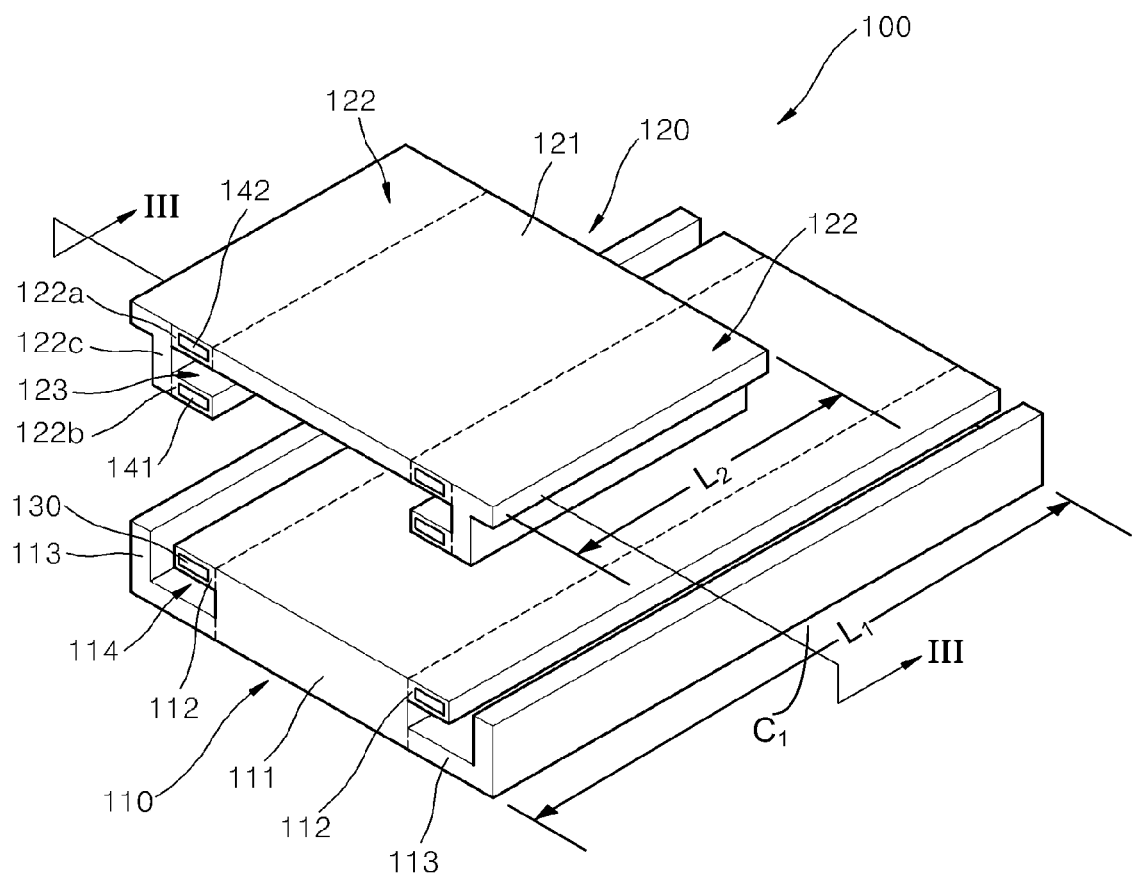
FIG. 2 is a partially-exploded perspective view of a sliding structure according to an embodiment of the present invention.
Figure 3:
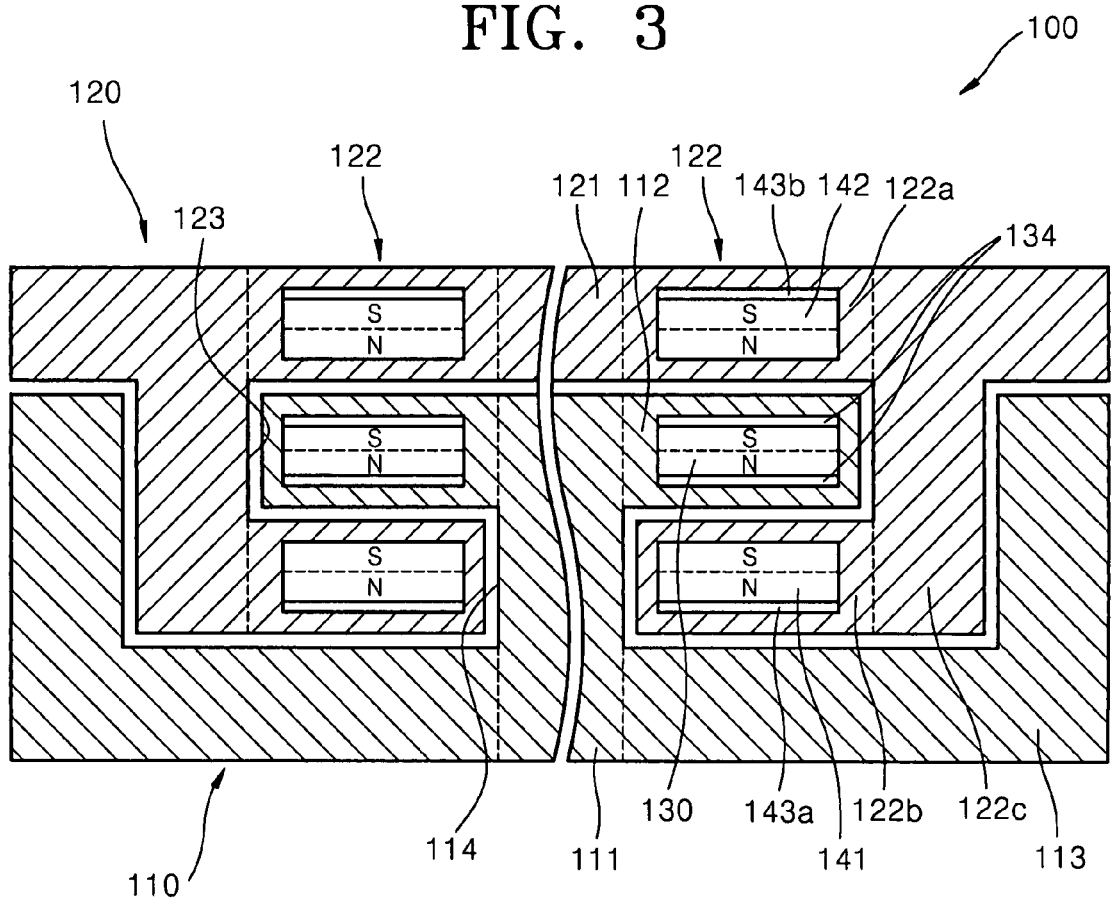
FIG. 3 is a cross-sectional view of the sliding structure of FIG. 2 taken along line III-III.

Referring to FIGS. 2 and 3, a sliding structure 100 for a mobile electronic device includes a first slider member 110 with first magnet units 130; and a second slider member 120 with second magnet units 141 and 142. Hereinafter, although the sliding structure 100 is described in operation with the first sliding member 110 being relatively stationary and the second slider member 120 sliding on the first slider member 110, it should be appreciated that the first and second sliding member 110, 120 move relative to each other. To this end, the sliding structure 100 may be operated by holding the second slider member 120 generally stationary and sliding the first slider member 110 on the second slider member 120. Furthermore, it should be appreciated that the terms up, upward, down, downward, top, bottom, right and left are used herein for sake of convenience of description and are not intended as limiting the present sliding structure 100 to a particular orientation, configuration or operation. Moreover, since the sliding structures 100, 200 shown and described herein are substantially right-left, mirror-image symmetric, only one side of the structures 100, 200 will be described for brevity.

The first slider member 110 is formed of a non-magnetic material (e.g., aluminium alloy, plastic, synthetic resin, etc.) and includes a support portion 111, guide portions 112, and auxiliary receiving portions 113.

The support portion 111 has a generally rectangular parallelepiped shape. The guide portions 112 extend outward from both sides of the support portion 111 such that the upper surfaces of the guide portions 112 are substantially coplanar with the top surface of the support portion 111. The guide portions 112 extend along substantially an entire length of the support portion 111.

The auxiliary receiving portions 113 extend outward from the sides of the support portion 111 past the outward edges of the guide portions 112 and then the auxiliary receiving portions 113 extend upward toward the guide portions 112 so that the auxiliary receiving portions 113 have generally L-shaped cross-sections. Bottom surfaces of the auxiliary receiving portions 113 are substantially coplanar with the bottom surface of the support portion 111 so that each of the auxiliary receiving portions 113 is spaced by a predetermined distance from each of the proximate guide portions 112. The auxiliary receiving portions 113 extend along substantially an entire length of the support portion 111. According to the configuration of the guide portions 112 and the auxiliary receiving portions 113, first receiving grooves 114 are defined on right and left sides of the support portion 111.

While the auxiliary receiving portions 113 extend outward and upward from right and left sides of the support portion 111 in FIGS. 2 and 3, the present embodiment is not limited thereto. That is, the auxiliary receiving portions 113 may extend from the bottom surface of the support portion 111 or be configured otherwise.

The support portion 111, the guide portion 112, and the auxiliary receiving portion 113 may be manufactured by various methods known in the art. For example, they may be manufactured by die casting or by bending a plate-shaped material and making the bent plate-shaped material subjected to plastic deformation. Additionally, they may be otherwise formed or molded so that the portions 111, 112, 113 are integral or unitary.

The second slider member 120 is formed of a non-magnetic material (e.g., aluminium alloy, plastic, synthetic resin, etc.) and includes a base portion 121 and receiving portions 122. The second slider member 120 may be made of the same or of a different material as the first slider member 110. As shown in FIGS. 2 and 4-10, the second slider member 120 has a length $L_2$ that is approximately half the length $L_1$ of the first slider member 110. However, the second slider member 120 may be configured otherwise. The first slider member length $L_1$ has a central portion $C_1$.

The base portion 121 has a generally planar shape. The receiving portions 122 extend from both sides of the base portion 121. The receiving portions 122 extend along substantially an entire length of the base portion 121.

The receiving portions 122 are configured to have complementary shapes to slidably mate with the guide portions 112 (and, optionally, the auxiliary receiving portions 113) of the first slide member 110. As shown, the receiving portions 122 each include a first receiving portion 122a, a second receiving portion 122b, and a connecting portion 122c. The first receiving portion 122a is generally coplanar with the base portion and extends outward from an edge thereof. The second receiving portion 122b is parallel with, spaced apart from and directly aligned under the first receiving portion 122a. The connecting portion 122c extends downward from the first receiving portion 122a and connects the second receiving portion 122b and the first receiving portion 122a. As is best shown in FIGS. 2 and 3, the first receiving portion 122a, second receiving portion 122b, and connecting portion 122c are configured so that the receiving portions 122 have generally J-shaped cross-sections.

The first receiving portion 122a, the second receiving portion 122b, and the connecting portion 122c cooperatively define a second receiving groove 123. When the sliding structure 100 is assembled, the first and second slider members 110, 120 are prevented from decoupling from each other by an interference fit that is provided by the guide portion 112 being inserted into the second receiving groove 123 and the second receiving portion 122b (and a part of the connecting portion 122c) being inserted into the first receiving groove 114. In this way, the receiving portions 122 and guide portions 112 guide relative sliding movement of the slider members 110, 120.

The base portion 121 and the receiving portions 122 may be manufactured by various methods known in the art. For example, the base portion 121 and the receiving portions 122 may be manufactured by die casting or by bending a plate-shaped material and making the bent plate-shaped material subjected to plastic deformation. Additionally, they may be otherwise formed or molded so that the portions 121, 122a, 122b, 122c are integral or unitary.

To further reduce a friction, a lubricant may be coated on surfaces of the guide portions 112, inner surfaces of the receiving portions 122, and inner surfaces of the auxiliary receiving portions 113 where contact may occur during the sliding operation. For example, a ceramic material may be coated on the surfaces where the contacts may occur during the sliding operation. Alternatively, one or more of the guide portions 112, auxiliary receiving portions 113 and receiving portions 122 may be made of a material (e.g., plastic, ceramic, glass, etc.) having inherent lubricity.

Each of the first magnet units 130 is coupled with a guide portion 112 to extend substantially an entire length of the guide portion 112 (and support portion 111).

While the first magnet units 130 may be permanent magnets, the present embodiment is not limited thereto. That is, the first magnet units 130 may be electromagnets.

Although the first magnet unit 130 is substantially enclosed in or otherwise configured in the guide portion 112 as shown in FIGS. 2 and 3, the present embodiment is not limited thereto. That is, the first magnet unit 130 may be configured on one or more surfaces of the guide portion 112.

Figure 4:
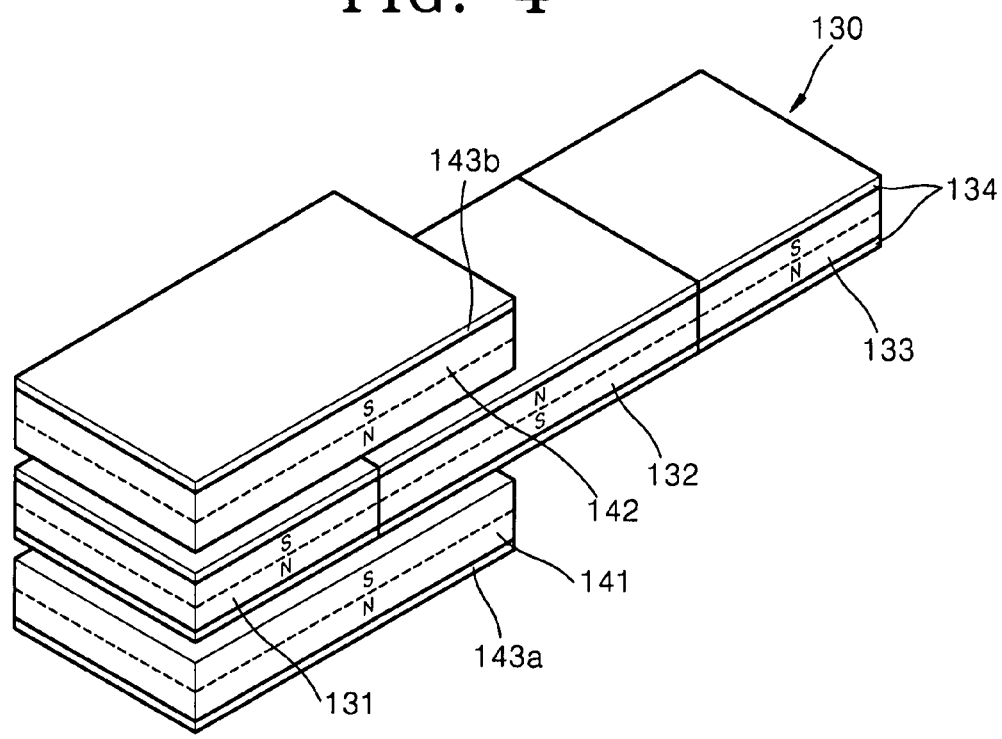
FIG. 4 is a perspective view illustrating a configuration of a first magnet unit and second magnet units of the sliding structure of FIG. 2.

Referring to FIG. 4, the first magnet unit 130 includes a first end magnet 131, an intermediate magnet 132, and a second end magnet 133 which are aligned to be collinear and coextensive.

While a first end of the intermediate magnet 132 contacts the first end magnet 131 and a second end of the intermediate magnet 132 contacts the second end magnet 133 in FIG. 4, the present embodiment is not limited thereto. That is, one or more of the first and second end magnets 131, 133 may be spaced apart from the intermediate magnet 132 by one or more predetermined distances.

The first end magnet 131, the intermediate magnet 132, and the second end magnet 133 have a rectangular parallelepiped shape, and have magnetic poles arranged in a direction perpendicular to a sliding direction (i.e., the sliding direction being defined by an axis that is generally parallel to the length of the first slide member 110).

While the first end magnet 131 and the second end magnet 133 are shorter than the intermediate magnet 132 in FIG. 4, the present embodiment is not limited thereto. That is, the first end magnet 131 and the second end magnet 133 may be longer than or equal to the intermediate magnet 132.

Figure 8:
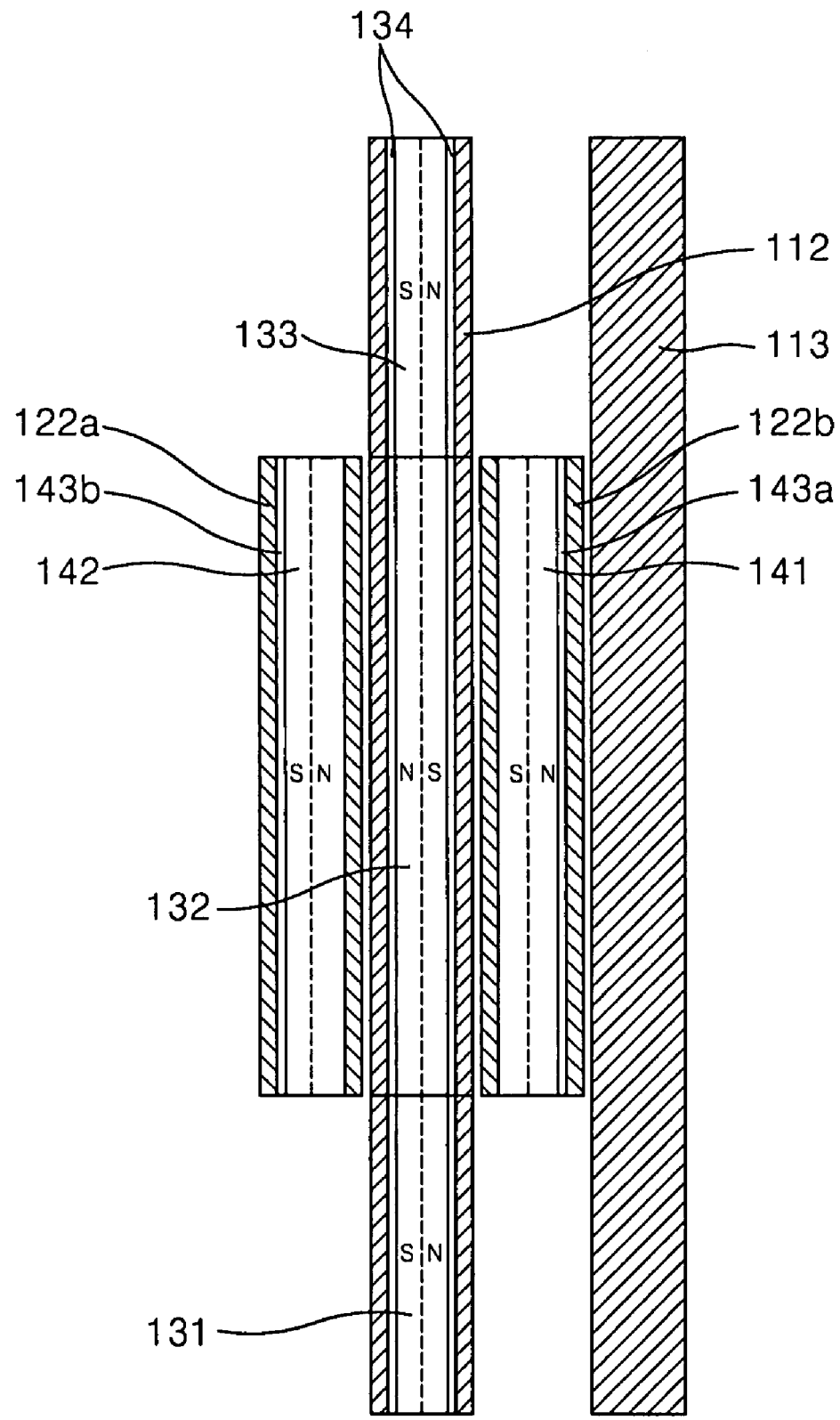
FIG. 8 is a cross-sectional view of the sliding structure of FIG. 7 taken along line VIII-VIII.

Although the intermediate magnet 132 has substantially the same length as the second magnet units 141 and 142 (as best shown in FIG. 8), the present embodiment is not limited thereto. That is, the length of the intermediate magnet 132 may be longer or shorter as desired.

The magnetic poles of the first end magnet 131 and the second end magnet 133 are arranged such that the S pole is higher in location (i.e., facing the second slide member 120) than the N pole, whereas the magnetic poles of the intermediate magnet 132 are arranged opposite to the arrangement of the end magnets 131, 133 such that the N pole is higher in location than the S pole.

Although the magnetic poles of the first end magnet 131 and the second end magnet 133 are arranged such that the S pole is higher in location than the N pole, and the magnetic poles of the intermediate magnet 132 are arranged such that the N pole is higher in location than the S pole (as best shown in FIG. 4), the present embodiment is not limited thereto. Alternatively, the magnetic poles of the first end magnet 131, the intermediate magnet 132, and the second end magnet 133 may be arranged oppositely (i.e., with the N and S poles being reversed) to the illustrated arrangement. That is, the magnetic poles of the first end magnet 131 and the second end magnet 133 may be arranged such that the N pole is higher in location than the S pole, whereas the magnetic poles of the intermediate magnet 132 may be arranged such that the S pole is higher in location than the N pole. In this case, however, the magnetic poles of the second magnet units 141 and 142 should be oppositely arranged as well according to the changed magnetic poles of the magnets 131, 132, and 133 of the first magnet unit 130.

Magnetic shields 134 may be configured on top and bottom surfaces of the first magnet unit 130.

The magnetic shields 134 are formed of a ferromagnetic substance to shield magnetic lines of force generated from the first magnet unit 130. The ferromagnetic substance may be an AD-MU alloy.

Each pair of second magnet units 141 and 142 are coupled with a receiving portion 122.

While the second magnet units 141 and 142 are permanent magnets, the present embodiment is not limited thereto. That is, the second magnet units 141 and 142 may be electromagnets.

Although the second magnet units 141 and 142 are substantially enclosed in or otherwise configured in the receiving portion 122 as shown in FIGS. 2 and 3, the present embodiment is not limited thereto. That is, the second magnet units 141 and 142 may be configured on one or more surfaces of the receiving portion 122 (e.g., on the portions 122a, 122b).

The second magnet units 141 and 142 have a rectangular parallelepiped shape, and are respectively configured in the second receiving portion 122b and the first receiving portion 122a such that the first magnet unit 130 is interposed therebetween when the slide members 110, 120 of the sliding structure 100 are assembled. As can be appreciated, the second magnet units 141 and 142 and the first magnet unit 130 magnetically interact with each other to facilitate a sliding operation.

The magnetic poles of the second magnet units 141 and 142 are arranged in a direction perpendicular to the sliding direction and in the same order. That is, both the magnetic poles of the second magnet units 141 and 142 are arranged such that the S pole is higher in location than the N pole.

The order of the magnetic poles of the second magnet units 141 and 142 is the same as the order of the magnetic poles of the first end magnet 131 and the second end magnet 133 so that an attraction force as well as a repelling force can act when the second magnet units 141 and 142 are moved toward the first end magnet 131 and the second end magnet 133 to aid the sliding operation.

As best shown in FIG. 4, the second magnet units 141 and 142 are longer than the first end magnet 131 and the second end magnet 133.

Although the second magnet units 141 and 142 are longer than the first end magnet 131 and the second end magnet 133, the present embodiment is not limited thereto.

The intermediate magnet 132 and the second magnet units 141 and 142 are arranged so that an imaginary line, which is perpendicular to the lengths of the second magnet units 141 and 142 and connects facing surfaces of the second magnet units 141 and 142, can pass through at least a part of the intermediate magnet 132 during the sliding operation. In this structure, a repelling force acts between the intermediate magnet 132 and the second magnet units 141 and 142. Accordingly, a friction is minimized when the second slider member 120 including the second magnet units 141 and 142 slides on the first slider member 110 including the intermediate magnet 132 since the second slider member 120 can be raised from the first slider member 110 due to the repelling force. In this case, the degree to which the second slider member 120 is elevated above the first slider member 110 is related to a magnetic force, and particularly, to the dimensions and properties of the used magnets.

As further shown in FIGS. 3 and 4, magnetic shields 143a and 143b are configured on a bottom surface of the second magnet unit 141 and a top surface of the second magnet unit 142.

The material and function of the magnetic shields 143a and 143b are substantially similar as those of the magnetic shields 134, and thus a detailed explanation thereof will not be repeated.

Although the magnetic shields 143a and 143b are configured on the bottom surface of the second magnet unit 141 and the top surface of the second magnet unit 142, respectively, as shown in FIG. 4, the present embodiment is not limited thereto. That is, the magnetic shields 143a and 143b may be further configured on a top surface of the second magnet unit 141 and a bottom surface of the second magnet unit 142, respectively. Additionally, magnetic shields may be configured on side and/or end surfaces of the magnet units 141, 142.

While the first slider member 110 is longer than the second slider member 120 in FIG. 2, the present embodiment is not limited thereto. That is, the first slider member 110 may be shorter than the second slider member 120.

When the sliding structure 100 configured as described above is used in a mobile electronic device (e.g., such as a mobile phone, a camera, a portable multimedia player (PMP), etc.) the sliding operation is performed in such a manner that one of the first slider member 110 and the second slider member 120 is embedded in a main body of the device (e.g., in which electrical components, such as batteries, or main chipsets of the electronic device are integrated), whereas the other one of the first slider member 110 and the second slider member 120 is embedded in a sub body of the device (e.g., having a relatively simple structure).

One of the first slider member 110 and the second slider member 120 may be formed by directly processing the main body, and the other of the first slider member 110 and the second slider member 120 may be formed by directly processing the sub body. In this case, the occupied area can be reduced, and thus the sliding type mobile electronic device can be made thin.

The operation of the sliding structure 100 constructed as described above will now be explained.

Figure 5:
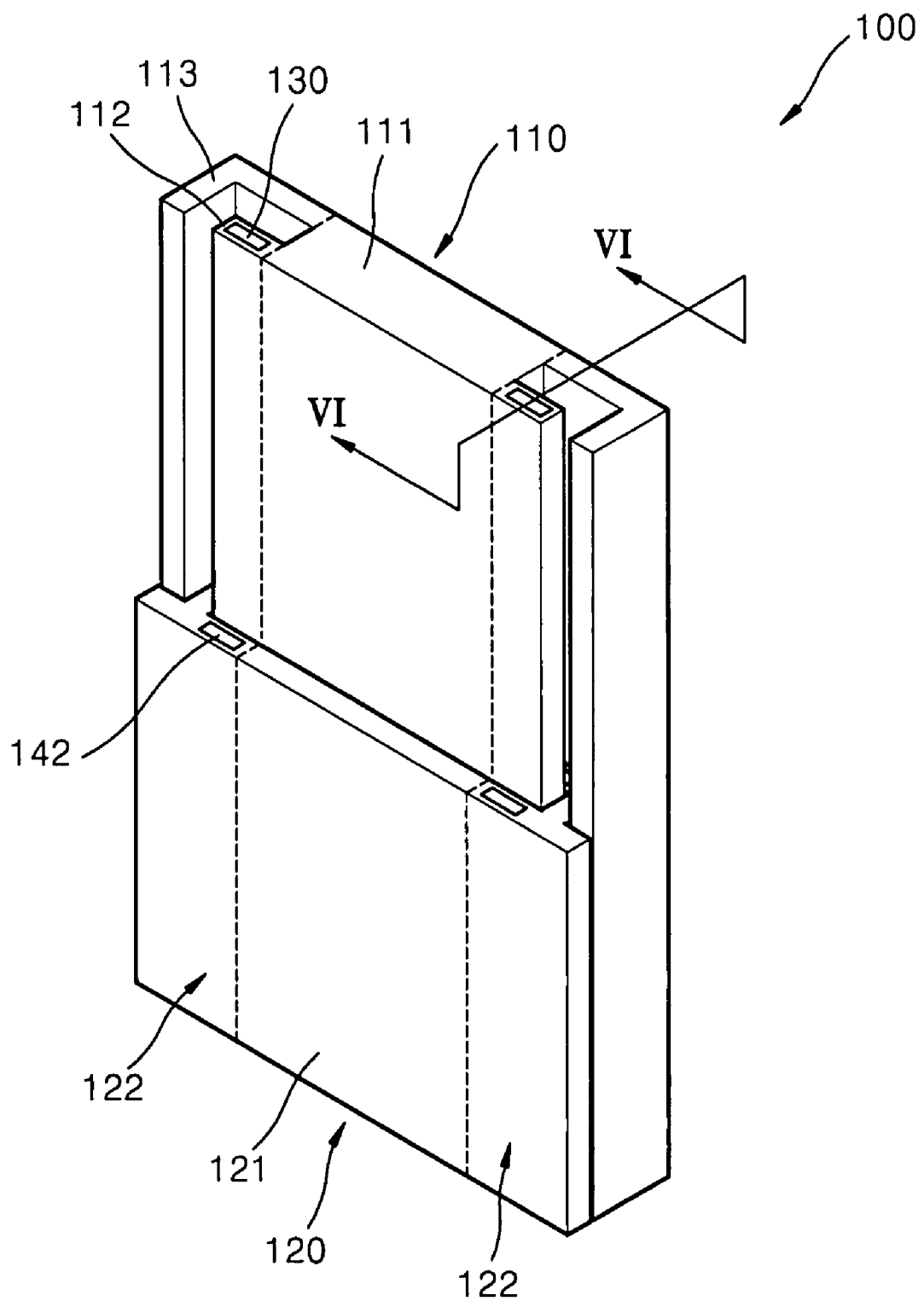
FIG. 5 is a perspective view illustrating an assembled view of the sliding structure of FIG. 2 with the second slider member being oriented at an initial position.
Figure 6:
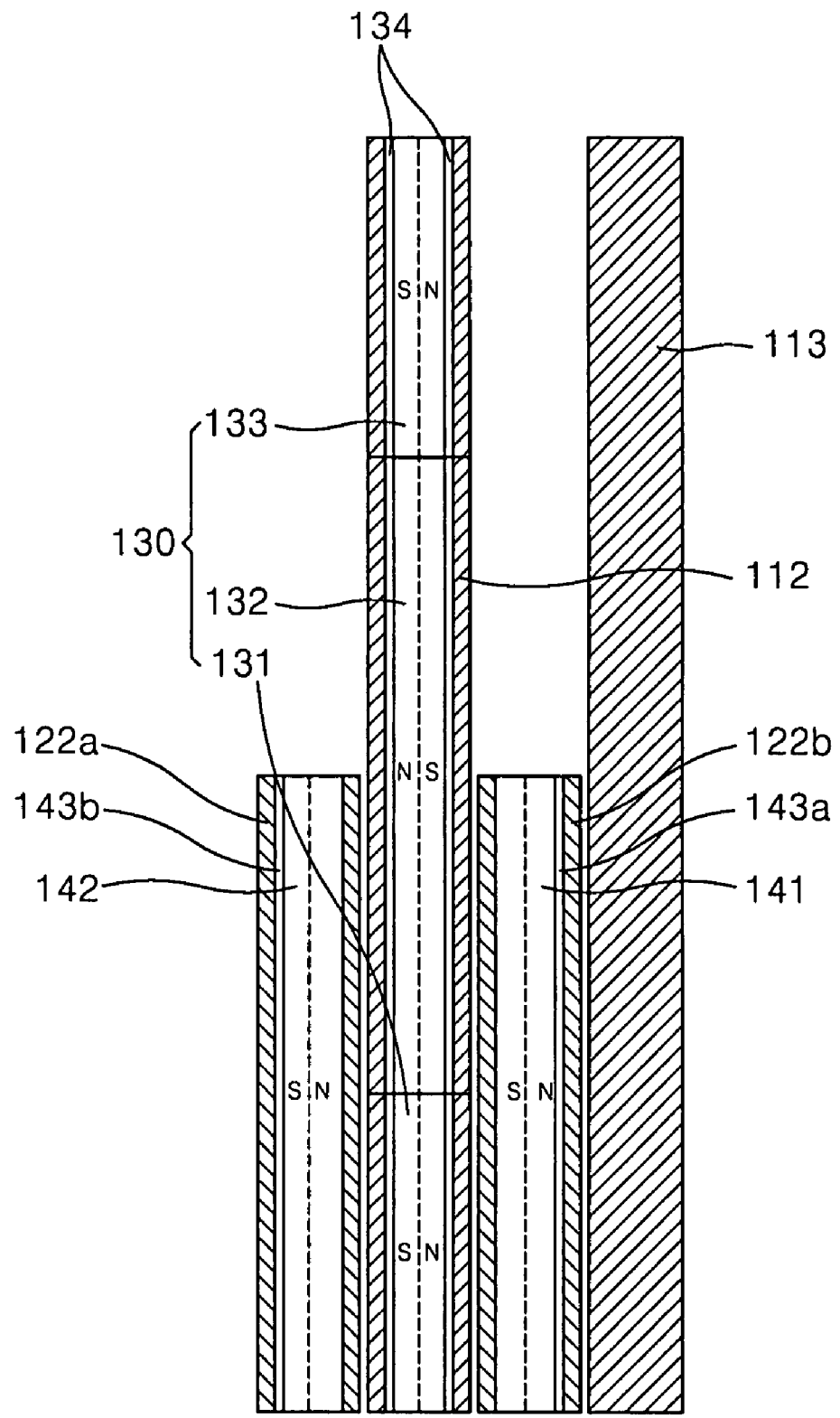
FIG. 6 is a cross-sectional view of the sliding structure of FIG. 5 taken along line VI-VI.
Figure 7:
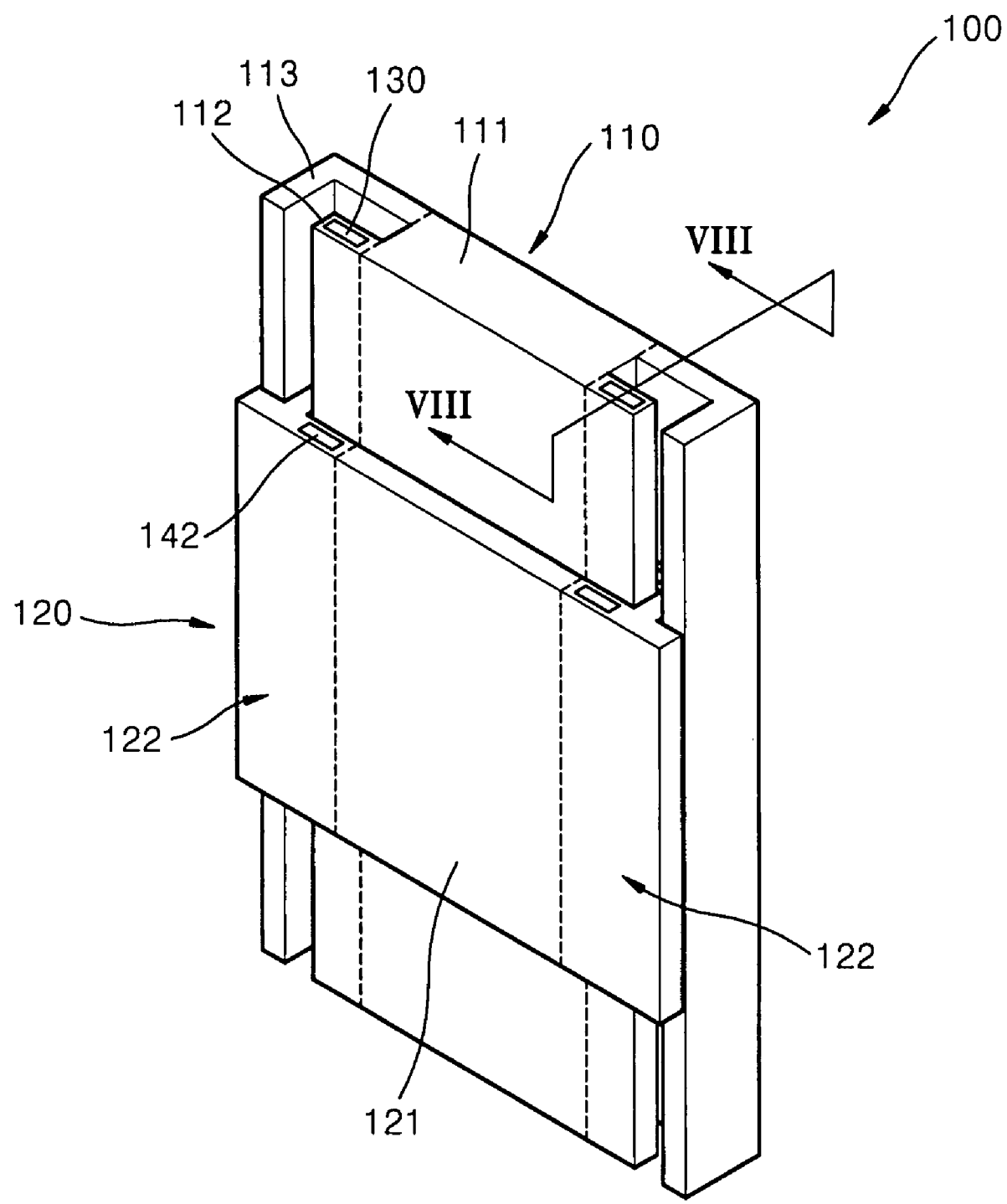
FIG. 7 is a perspective view illustrating an assembled view of the sliding structure of FIG. 2 with the second slider member being oriented at an intermediate position.
Figure 9:
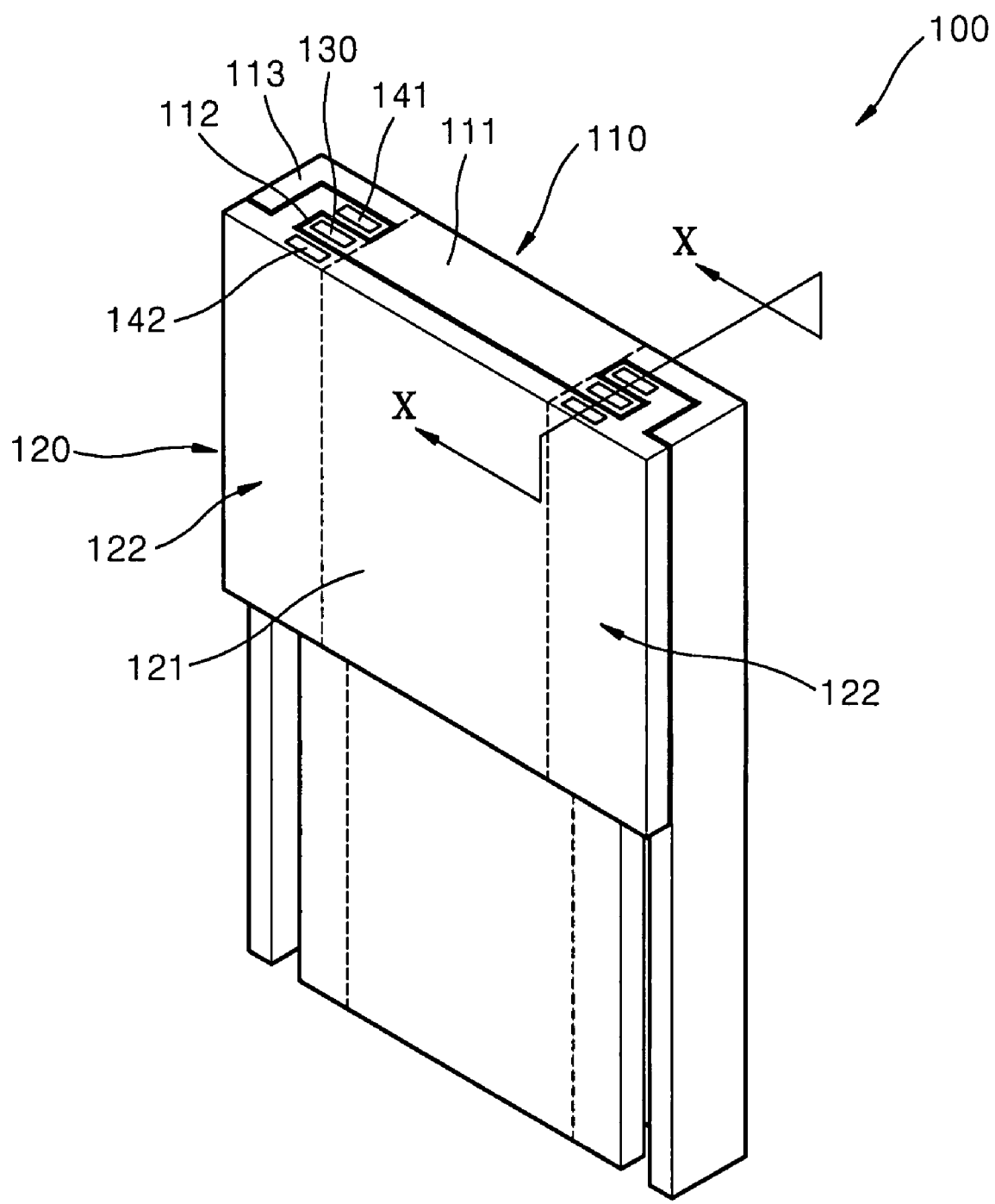
FIG. 9 is a perspective view illustrating an assembled view of the sliding structure of FIG. 2 with the second slider member being oriented at a final position.
Figure 10:
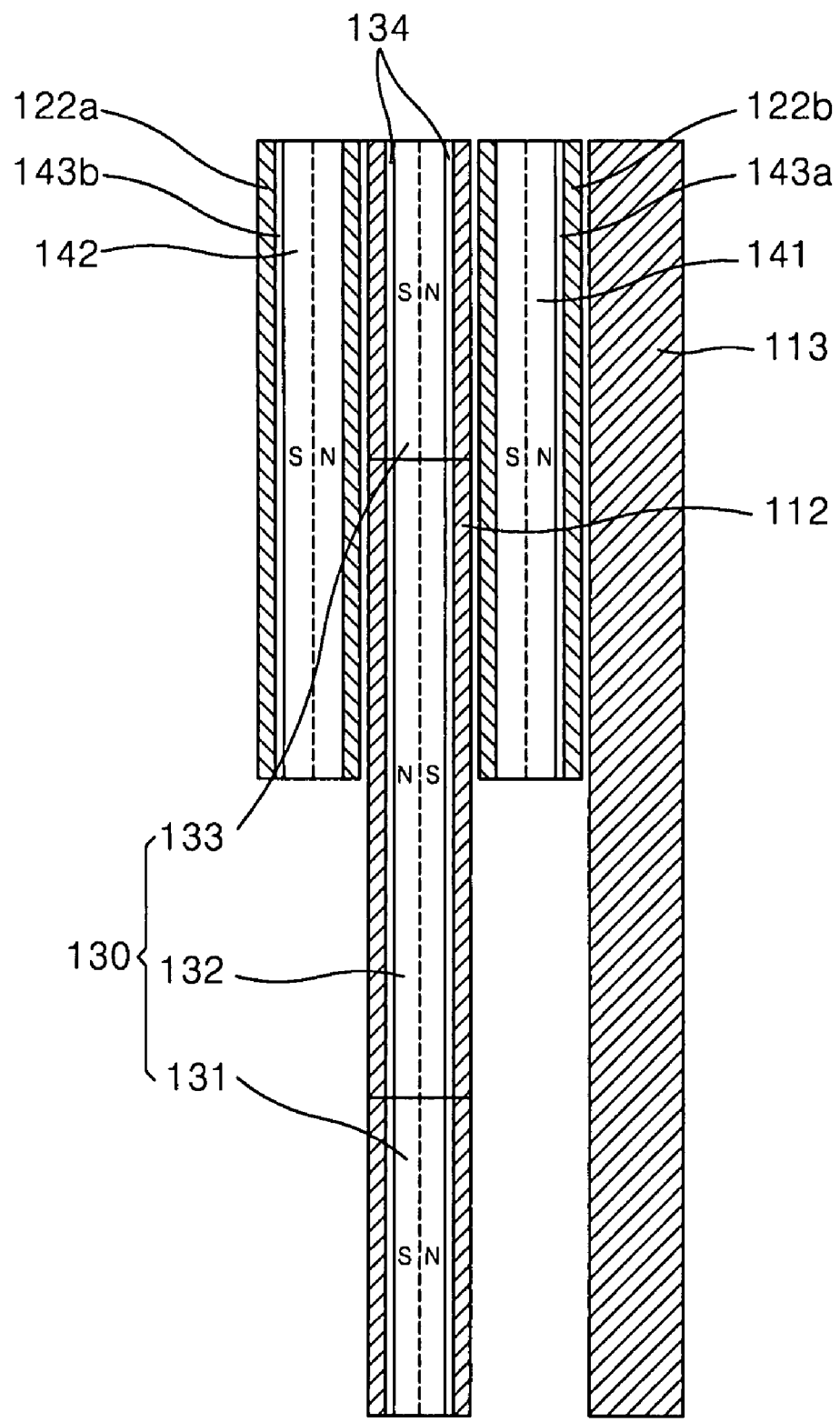
FIG. 10 is a cross-sectional view of the sliding structure of FIG. 9 taken along line X-X.

FIG. 5 is a perspective view illustrating that the second slider member 120 is disposed at an initial position. FIG. 6 is a cross-sectional view taken along line VI-VI of FIG. 5. FIG. 7 is a perspective view illustrating that the second slider member 120 is disposed at an intermediate position. FIG. 8 is a cross-sectional view taken along line VIII-VIII of FIG. 7. FIG. 9 is a perspective view illustrating that the second slider member 120 is disposed at a final position. FIG. 10 is a cross-sectional view taken along line X-X of FIG. 9. Although the terms initial and final are used herein, it should be appreciated that these are used for convenience of description and are not meant to be limiting to the operation of the present sliding structure 100. Indeed, it should be appreciated that the initial and final positions or orientations discussed hereinafter may be reversed.

Referring to FIGS. 5 and 6, the second slider member 120 is disposed at an initial position. In the initial position, the second slider member is disposed at a lower position of the first slider member 110.

Referring to FIG. 6, a substantially entire length of the first end magnet 131 and a part of the intermediate magnet 132 that is adjacent or proximate the first end magnet 131 are disposed between the second magnet units 141 and 142. In this case, an attraction force acts between the second magnet units 141 and 142 and the first end magnet 131 to positively hold the second slider member 120 in the initial position. Furthermore, in this initial position a repelling force acts between the intermediate magnet 132 and the second magnet units 141 and 142 due to the orientation of the magnetic poles of the second magnet units 141 and 142 and the first magnet unit 130.

Due to the attraction force, the second slider member 120 can be stably disposed at the initial position. Furthermore, due to the repelling force, the second slider member 120 is somewhat elevated from the first slider member 110, thereby reducing a friction in a subsequent sliding operation.

When a user slides the second slider member 120 from the initial position of FIGS. 5 and 6 toward the intermediate position, the second magnet units 141 and 142 move upward past the first end magnet 131 until the intermediate magnet 132 becomes disposed between. As the second magnet units 141, 142 move away from the first end magnet 131, the repelling force between the second magnet units 141 and 142 and the intermediate magnet 132 increases.

Even though the user may quickly slide the second slider member 120 up, the repelling force acts between the second magnet units 141 and 142 and the intermediate magnet 132 to prevent the second slider member 120 from moving suddenly, thereby preventing impacts on the sliding structure 100. Also, since the second slider member 120 is raised from the first slider member 110 due to the repelling force, a friction can be reduced during the sliding operation.

When the user continues to slide the second slider member 120 up from the initial position, the second slider member 120 of the sliding structure 100 reaches an intermediate state as shown in FIGS. 7 and 8.

Referring to FIG. 8, since substantially an entire length of the intermediate magnet 132 is disposed between the second magnet units 141 and 142, a strong repelling force acts between the second magnet units 141 and 142 and the intermediate magnet 132. This repelling force facilitates moving the second slider member 120 from the intermediate position toward the initial and final positions.

Accordingly, when the second slider member 120 is oriented in or proximate to the intermediate position of FIGS. 7 and 8, the user can slide the second slider member 120 up with little difficulty due to the repelling force between the second magnet units 141 and 142 and the intermediate magnet 132 and an attraction force between the second magnet units 141 and 142 and the second end magnet 133.

In this case, since the user can slide the sliding structure 100 up without exertion, excessive impacts on the second slider member 120 can be prevented. Also, since the second slider member 120 is elevated from the first slider member 110 due to the repelling force, a friction can be reduced during the sliding operation.

When the user continues to slide the second slider member 120 up, the second slider member 120 of the sliding structure 100 reaches a final position as shown in FIGS. 9 and 10

Referring to FIG. 9, an attraction force acts between the second magnet units 141 and 142 and the second end magnet 133 and a repelling force acts between the intermediate magnet 132 and the second magnet units 141 and 142 due to the arrangements of the magnetic poles of the second magnet units 141 and 142 and the first magnet unit 130.

Due to the attraction force at the final position between the second magnet units 141, 142 and the second end magnet 133, the second slider member 120 can be stably disposed or positively held at the final position. Furthermore, due to the repelling force, the second slider member 120 is somewhat elevated from the first slider member 110, thereby reducing a friction when the user slides the second slider member 120 down again.

As previously mentioned, although the second slider member 120 is slid up from an initial position to a final position as illustrated in FIGS. 5 through 10, the present embodiment is not limited thereto. That is, the second slider member 120 may be slid down from an initial position being the final position of FIGS. 9 and 10 to a final position being the initial position of FIGS. 5 and 6.

Since the sliding structure 100 is configured as described above, excessive impacts, which may occur during the sliding operation, can be avoided or substantially minimized.

Also, since the sliding structure 100 may be manufactured by forming either the first slider member 110 or the second slider member 120 by directly processing a main body and forming the other by directly processing a sub body, the occupied area can be reduced and the mobile electronic device can be made thin.

Also, the sliding structure 100 configured as described above can be raised by a magnetic force, a friction can be reduced during the sliding operation and thus a force necessary for handing the sliding structure 100 can be reduced.

Another sliding structure will now be explained with reference to FIGS. 11 and 12.

Figure 11:
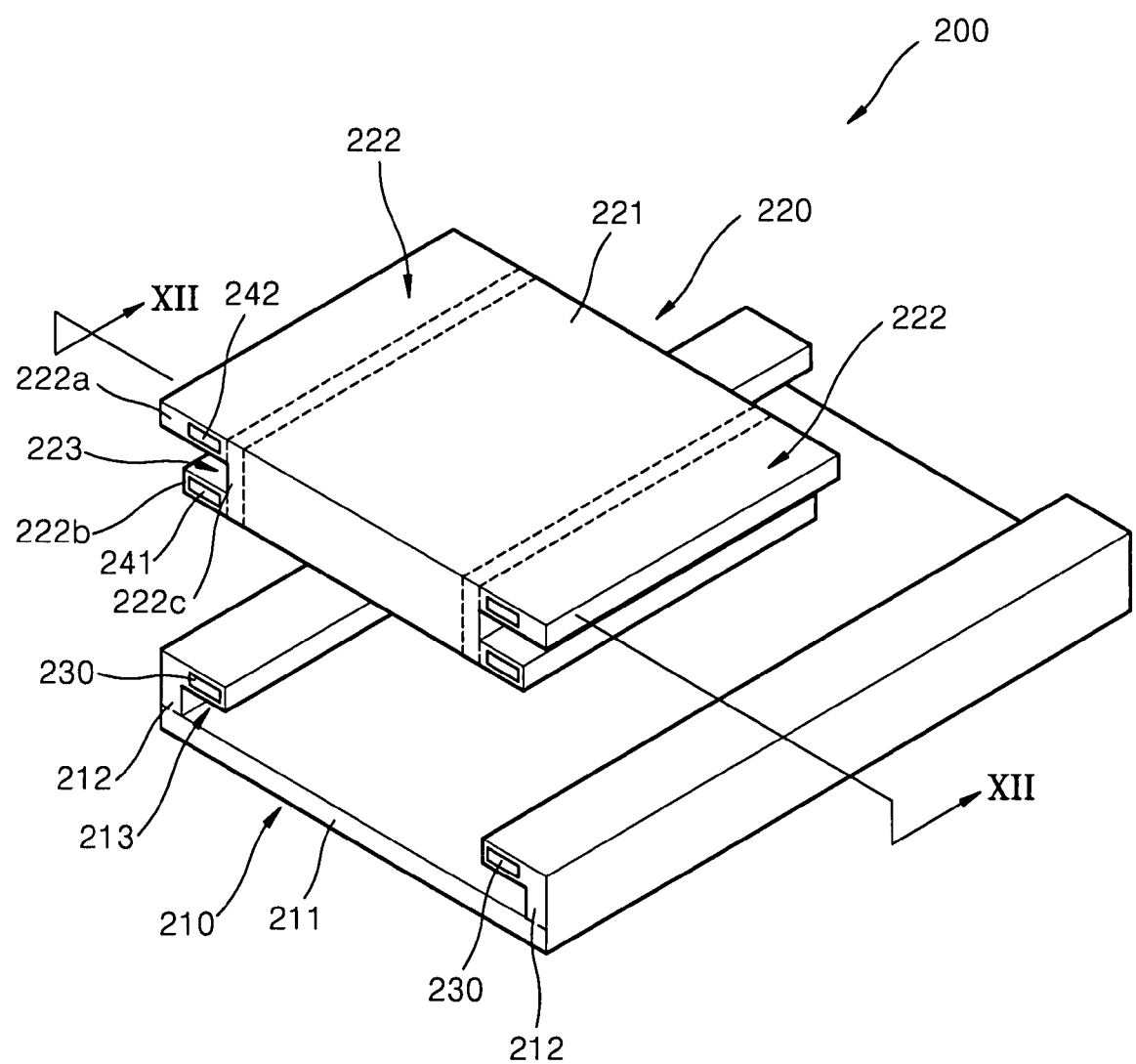
FIG. 11 is a partially-exploded perspective view illustrating a sliding structure according to another embodiment of the present invention.

FIG. 11 is an exploded perspective view of a sliding structure according to another embodiment of the present invention. FIG. 12 is a cross-sectional view taken along line XII-XII of FIG. 11.

Figure 12:
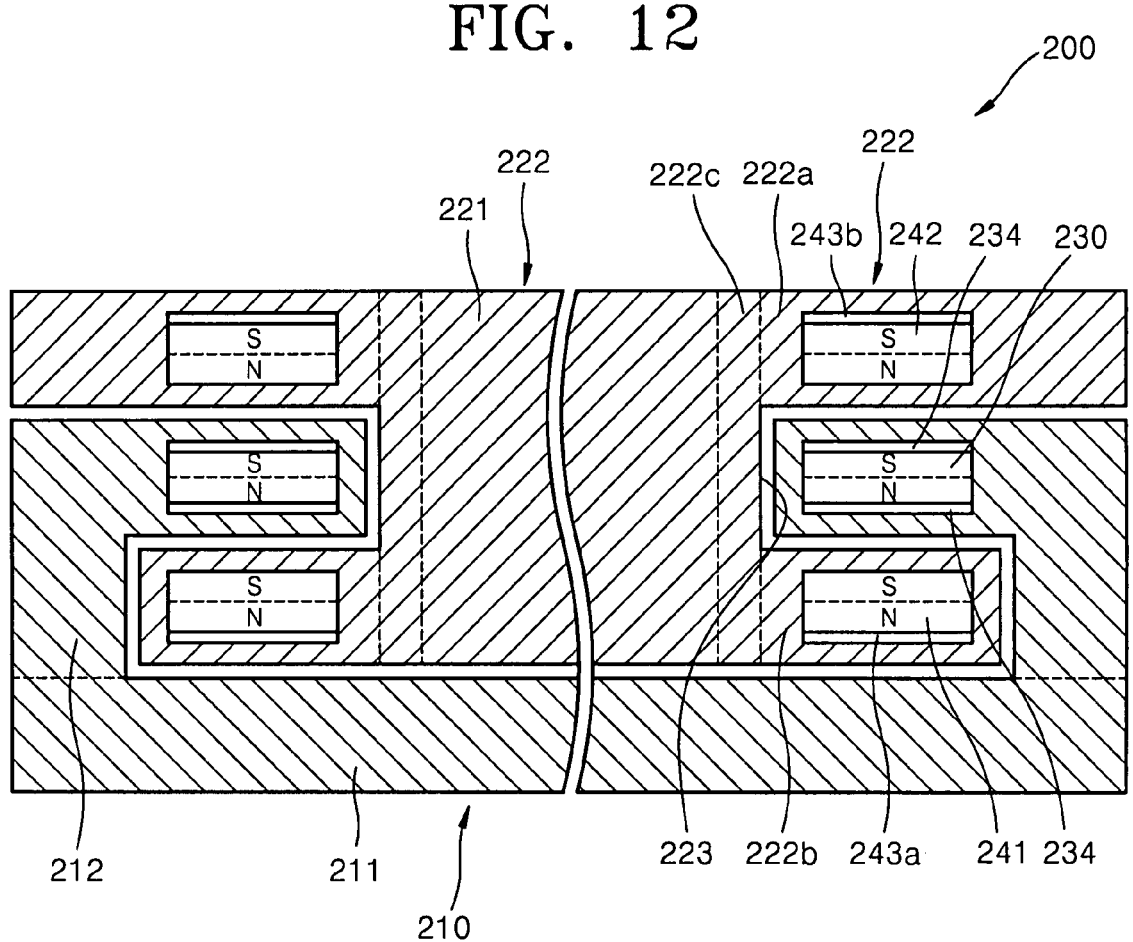
FIG. 12 is a cross-sectional view of the sliding structure of FIG. 11 taken along line XII-XII.

Referring to FIGS. 11 and 12, a sliding structure 200 for a mobile electronic device includes a first slider member 210 with first magnet units 230, and a second slider member 211 with second magnet units 241 and 242.

The first slider member 210 may be formed of a non-magnetic material (e.g., synthetic resin, plastic, aluminium, etc.) and includes a support portion 211 and guide portions 212.

The support portion 211 has a generally planar shape. The guide portions 212 extend from both sides of the support portion 211.

The guide portions 212 include a bottom portion that extends perpendicularly upward from a top surface of the support portion 211 and a top portion that extends inward from the first portion and generally parallel with the support portion 211 such that the guide portions 212 have generally L-shaped cross-sections. A first receiving groove 213 is defined between the top portion of the guide portion 212 and the support portion 211.

The second slider member 220 is formed of a non-magnetic material (e.g., aluminium alloy, synthetic resin, plastic, etc.) and includes a base portion 221 and receiving portions 222. The first and second slider members 210, 220 may be made of the same or different materials.

The base portion 221 has a generally rectangular parallelepiped shape. The receiving portions 222 extend from both sides of the base portion 221. As with the first embodiment 100 of the sliding structure, the guide portions 212 the receiving portions 222 are configured to have complementary shapes to facilitate slidable mating of the first and second slider members 210, 220.

The receiving portions 222 each include a first receiving portion 222a with an upper surface that is generally coplanar with an upper surface of the base portion 221, a second receiving portion 222b with a lower surface that is generally coplanar with a lower surface of the base portion 221, and a connecting portion 222c that is generally perpendicular to the first and second receiving portions 222a, 222b for connecting the portions 222a, 222b. As shown in FIG. 11, the portions 222a, 222b and 222c of the receiving portions 222 are configured so that the receiving portions have generally C-shaped, horseshoe-shaped or sideways U-shaped cross-sections.

The first receiving portion 222a and the second receiving portion 222b are parallel to and spaced apart from each other, and the connecting portion 222c connects the first receiving portion 222a and the second receiving portion 222b together and to the base portion 221. The portions 222a, 222b and 222c may be integrally or unitarily formed with the base portion 221.

The first receiving portion 222a, the second receiving portion 222b, and the connecting portion 222c cooperatively define a second receiving groove 223. When the sliding structure 200 is assembled, the guide portion 212 is inserted into the second receiving groove 223 and the second receiving portion 222b of the receiving portion 222 is inserted into the first receiving groove 213, so as to guide a sliding operation.

Each of the first magnet units 230 is configured in a guide portion 212. Furthermore, the second magnet units 241 and 242 are respectively configured in the second receiving portion 222b and the first receiving portion 222a so that the magnet units 241, 242 are parallel with each other, spaced apart from each other and directly aligned.

The first magnet unit 230 of FIGS. 11 and 12 may have a substantially similar structure as the first magnet unit 130 of FIGS. 1 through 10. That is, the first magnet unit 230 may extend a substantially entire length of the first slider unit 210 and include a first end magnet substantially similar to first end magnet 131 (FIG. 4), an intermediate magnet substantially similar to intermediate magnet 132 (FIG. 4), and a second end magnet substantially similar to second end magnet (FIG. 4). Although not illustrated, the first magnet unit 230 may be similar to first magnet unit 130 in shape and the direction and order of its magnetic poles.

Furthermore, the second magnet units 241 and 242 of FIGS. 11 and 12 may have a substantially similar structure as the second magnet units 141 and 142 of FIGS. 2 through 10. That is, the second magnet units 241 and 242 may be identical to the second magnet units 141 and 142 in shape and the direction and order of magnetic poles.

As shown in FIG. 12, magnetic shields 234 may be configured on top and bottom surfaces of the first magnet unit 230. Furthermore, magnetic shields 243a and 243b may be respectively configured on a bottom surface of the second magnet unit 241 and a top surface of the second magnet unit 242.

The magnetic shields 234, and the magnetic shields 243a and 243b may be formed of a ferromagnetic substance to shield magnetic lines of force generated from the first magnet unit 230 and the second magnet units 241 and 242. The ferromagnetic substance may be an AD-MU alloy.

When the sliding structure 200 configured as described above is used in a mobile electronic device (e.g., such as a mobile phone, a camera, or a portable multimedia player (PMP)), the sliding operation is performed in such a manner that one of the first slider member 210 and the second slider member 220 may be embedded in a main body (e.g., in which electrical components, such as batteries, or main chipsets of the electronic device are integrated), whereas the other one of the first slider member 210 and the second slider member 220 may be embedded in a sub body of the device (e.g., having a relatively simple structure).

One of the first slider member 210 and the second slider member 220 may be formed by directly processing the main body, and the other of the first slider member 210 and the second slider member 220 may be formed by directly processing the sub body. In this case, the occupied area can be reduced, and thus the sliding type mobile electronic device can be made thin.

Figure 1A:
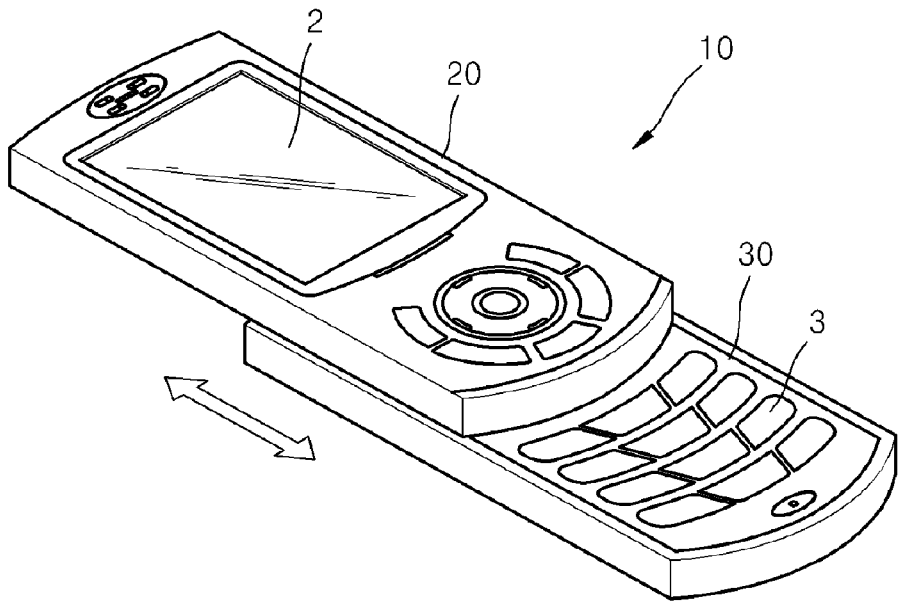
FIG. 1A is a perspective view of a conventional mobile phone having a sliding structure.
Figure 1B:
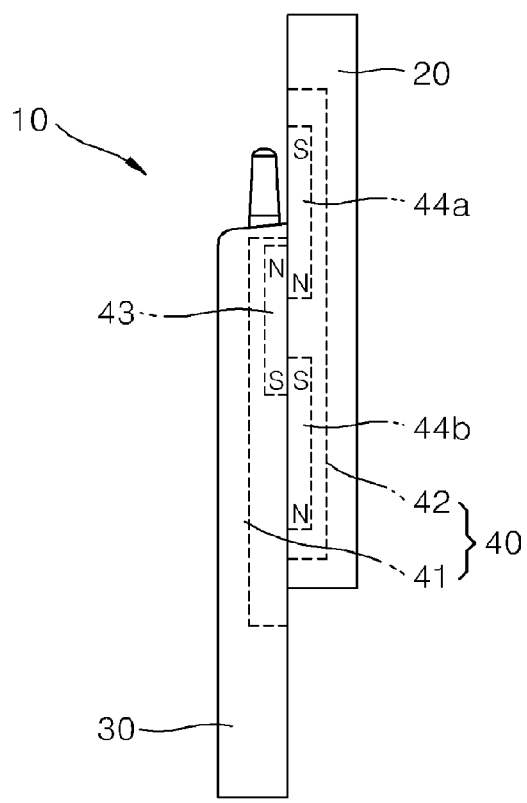
FIG. 1B is a partial see-through side view of the conventional mobile phone of FIG. 1A.
Figure 1C:
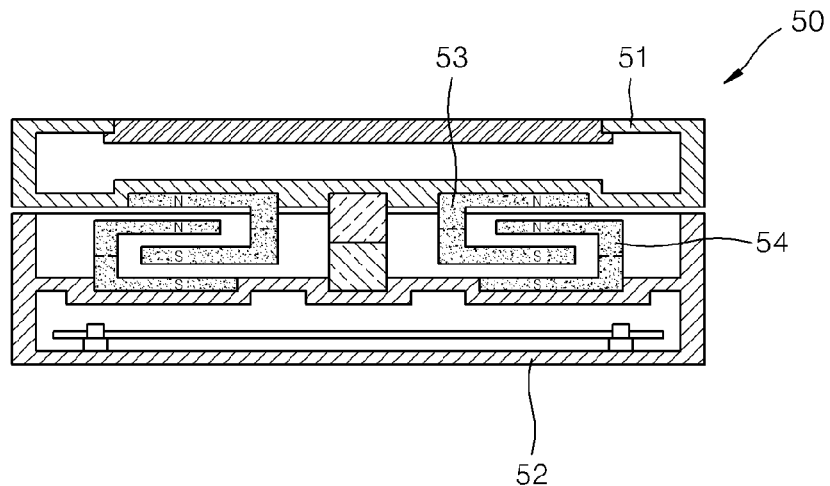
FIG. 1C is a cross-sectional view illustrating another conventional sliding structure.

Since the operation of the sliding structure 200 is substantially similar to the operation of the sliding structure 100 of FIG. 1, descriptions thereof have not been repeated.

As described above, the sliding structure according to the present invention can be employed for a mobile electronic device to make the device thin, and can smoothly slide with less friction during the sliding operation.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A magnetic levitation sliding structure comprising:
    a first slider member having a first length, the first slider member including a guide portion that extends at least a portion of the first length;
    a first magnet coupled with the guide portion;
    a second slider member having a second length, the second slider member including a receiving portion that extends at least a portion of the second length and has a complementary shape to the guide portion for slidably mating with the guide portion; and
    a pair of second magnets coupled with the receiving portion in a spaced-apart configuration, wherein the first magnet is configured between the pair of second magnets for repelling and attracting the first and second slider members;
    wherein the first magnet being configured between the pair of second magnets is defined as the first magnet having at least one point that lies on a line segment connecting a point on a first of the pair of second magnets and a point on a second of the pair of second magnets.

2. The sliding structure of claim 1 wherein the first magnet has magnet poles arranged in a direction perpendicular to a sliding direction.

3. The sliding structure of claim 1 wherein the first magnet comprises:
    an intermediate magnet having a first polarity, the intermediate magnet being configured in a central portion of the first length;
    a first end magnet having a second polarity, the first end magnet configured proximate a first end of the intermediate magnet; and
    a second end magnet having the second polarity, the second end magnet configured proximate a second end of the intermediate magnet.

4. The sliding structure of claim 3 wherein the first and second end magnets are connected to the first and second ends of the intermediate magnet.

5. The sliding structure of claim 4 wherein the first polarity is opposite to the second polarity.

6. The sliding structure of claim 5 wherein polarities of the second magnets are configured to attract the first and second end magnets and repel the intermediate magnet.

7. The sliding structure of claim 1 wherein each of the second magnets has magnet poles arranged in a direction perpendicular to a sliding direction.

8. The sliding structure of claim 1 further comprising at least one magnetic shield interposed between the first magnet and a second magnet of the pair of second magnets.

9. A magnetic levitation sliding structure for a portable electronic device including a first movable portion and a second movable portion, the magnetic levitation sliding structure comprising:
    a first slider member connected to one of the first and second movable portions, the first slider member including a first length, a guide portion that extends at least a portion of the first length, and a first magnet configured in the guide portion; and
    a second slider member connected to the other one of first and second movable second portions, the second slider member including a second length, a receiving portion that extends at least a portion of the second length and which has a complementary shape to the guide portion for slidably mating with the guide portion, and a spaced-apart pair of second magnets configured in the receiving portion,
    wherein the first magnet is configured between the spaced-apart pair of second magnets for facilitating relative movement of the first and second movable portions;
    wherein the first magnet being configured between the pair of second magnets is defined as the first magnet having at least one point that lies on a line segment connecting a point on a first of the pair of second magnets and a point on a second of the pair of second magnets.

10. The sliding structure of claim 9 wherein the first magnet comprises:
    an intermediate magnet having a first polarity, the intermediate magnet being configured in a central portion of the first length;
    a first end magnet having a second polarity, the first end magnet configured proximate a first end of the intermediate magnet; and
    a second end magnet having the second polarity, the second end magnet configured proximate a second end of the intermediate magnet.

11. The sliding structure of claim 10 wherein the first and second end magnets are connected to the first and second ends of the intermediate magnet.

12. The sliding structure of claim 10 wherein the first polarity is opposite to the second polarity.

13. The sliding structure of claim 12 wherein polarities of the second magnets are configured to attract the first and second end magnets and repel the intermediate magnet.

14. The sliding structure of claim 10 wherein the intermediate magnet has a length that is substantially similar to the second length.

15. The sliding structure of claim 9 further comprising at least one magnetic shield interposed between the first magnet and a second magnet of the pair of second magnets.

16. A portable electronic device comprising:
a first slidably movable portion including a first slider member, the first slider member including a first length, a guide portion that extends at least a portion of the first length, and a first magnet configured in the guide portion to extend a substantial entirety of the first length; and
a second slidably movable portion including a second slider member, the second slider member including a second length, a receiving portion that extends at least a portion of the second length and which has a complementary shape to the guide portion for slidably mating with the guide portion, and a spaced-apart pair of second magnets configured in the receiving portion,
wherein the first magnet is configured between the spaced-apart pair of second magnets for facilitating relative sliding movement of the first and second slidably movable portions;
wherein the first magnet being configured between the pair of second magnets is defined as the first magnet having at least one point that lies on a line segment connecting a point on a first of the pair of second magnets and a point on a second of the pair of second magnets.

17. The portable electronic device of claim 16 wherein the first magnet comprises:
an intermediate magnet having a first polarity, the intermediate magnet being configured in a central portion of the first length;
a first end magnet having a second polarity, the first end magnet configured proximate a first end of the intermediate magnet; and
a second end magnet having the second polarity, the second end magnet configured proximate a second end of the intermediate magnet.

18. The sliding structure of claim 17 wherein the first and second end magnets are connected to the first and second ends of the intermediate magnet.

19. The sliding structure of claim 17 wherein the first polarity is opposite to the second polarity.

20. The sliding structure of claim 19 wherein polarities of the second magnets are configured to attract the first and second end magnets and repel the intermediate magnet.

* * * * *